United States Patent [19]

Bier et al.

[11] 4,435,546

[45] Mar. 6, 1984

[54] POLYESTERS COMPOSITIONS WHICH CRYSTALLIZE RAPIDLY

[75] Inventors: Peter Bier, New Martinsville, W. Va.; Rudolf Binsack, Krefeld, Fed. Rep. of Germany

[73] Assignee: Bayer Aktiengesellschaft, Leverkusen, Fed. Rep. of Germany

[21] Appl. No.: 40,385

[22] Filed: May 18, 1979

Related U.S. Application Data

[63] Continuation-in-part of Ser. No. 960,976, Nov. 15, 1978, abandoned, and Ser. No. 875,015, Feb. 3, 1978, abandoned, Ser. No. 960,976, , which is a continuation of Ser. No. 852,894, Nov. 18, 1977, abandoned.

[30] Foreign Application Priority Data

| | | | |
|---|---|---|---|
| Nov. 2, 1977 | [NL] | Netherlands | 1712080 |
| Nov. 21, 1977 | [IT] | Italy | 51875-77 |
| Nov. 21, 1977 | [JP] | Japan | 53-139036 |
| Nov. 22, 1977 | [GB] | United Kingdom | 4860577 |
| Nov. 23, 1977 | [FR] | France | 77 35259 |
| Nov. 23, 1977 | [NL] | Netherlands | 7712914 |
| Nov. 23, 1977 | [CH] | Switzerland | 14348-77 |

[51] Int. Cl.³ ............... C08F 283/00; C08G 63/76; C08L 67/00

[52] U.S. Cl. ................... 525/418; 264/239; 264/176 R; 524/730; 528/272; 528/302; 528/308.2; 528/308.6

[58] Field of Search ............ 528/272, 302, 309, 308.2, 528/308.6; 524/730; 525/418

[56] References Cited

U.S. PATENT DOCUMENTS

| | | | |
|---|---|---|---|
| 3,134,744 | 5/1964 | Starck et al. | 525/445 |
| 3,368,995 | 2/1968 | Furukawa et al. | 260/40 R |
| 3,372,148 | 3/1968 | Wiener | 428/473 |
| 3,435,093 | 3/1969 | Cope | 525/166 |
| 3,516,957 | 6/1970 | Gray | 524/315 |
| 3,565,852 | 2/1971 | Conix et al. | 260/40 R |
| 3,576,774 | 4/1971 | Myers et al. | 260/22 R |
| 3,639,527 | 2/1972 | Brinkmann | 525/64 |
| 3,644,267 | 2/1972 | Jackson et al. | 260/33.6 R |
| 3,673,139 | 6/1972 | Hrach | 528/305 X |
| 3,692,744 | 9/1972 | Rich et al. | 528/296 |
| 3,707,578 | 12/1972 | Vasta | 528/309 X |
| 3,835,089 | 9/1974 | Fox et al. | 260/40 R |
| 3,843,615 | 10/1974 | Herwig et al. | 525/444 |
| 3,892,821 | 7/1975 | Koleske et al. | 525/411 |
| 3,907,926 | 9/1975 | Brown et al. | 260/45.9 R |
| 3,966,671 | 6/1976 | Smith | 260/40 R |
| 4,049,611 | 9/1977 | Hirzy | 260/31.6 |
| 4,097,421 | 6/1978 | Chang | 260/40 R X |
| 4,125,572 | 11/1978 | Scott | 528/306 |
| 4,135,009 | 1/1979 | Mercurio | 528/305 |

FOREIGN PATENT DOCUMENTS

| | | |
|---|---|---|
| 2042447 | 4/1971 | Fed. Rep. of Germany . |
| 1104089 | 2/1968 | United Kingdom . |
| 1111012 | 4/1968 | United Kingdom . |
| 1224684 | 3/1971 | United Kingdom . |
| 1228966 | 4/1971 | United Kingdom . |
| 1340761 | 12/1973 | United Kingdom . |

*Primary Examiner*—Lucille M. Phynes
*Attorney, Agent, or Firm*—Gene Harsh; Lawrence S. Pope

[57] ABSTRACT

Polyalkylene terephthalates containing 0.5–30% by weight of monomeric aliphatic carboxylic acid esters have a higher crystallization speed and thus allow lower mold temperatures and shorter injection cycles. The polyalkylene terephthalates generally have intrinsic viscosities in excess of about 0.4 dl/g in 1:1 phenol tetrachloroethane at 25° C. and are at least about 90 mol % terephthalic acid based. The ester additive is based on aliphatic cycloaliphatic or araliphatic carboxylic acids, with sebacic and adipic being preferred, and aliphatic, cycloaliphatic or araliphatic alcohols.

Faster crystallization rates can be imparted to polyalkylene terephthalates by mixing them with the ester additive and melt homogenizing the mixture.

23 Claims, No Drawings

POLYESTERS COMPOSITIONS WHICH CRYSTALLIZE RAPIDLY

This application is a continuation-in-part of our co-pending applications Ser. No. 960,976 filed Nov. 15, 1978 and Ser. No. 875,015 filed Feb. 3, 1978, both abandoned. Ser. No. 960,976 is in turn a continuation of application Ser. No. 852,894 filed Nov. 18, 1977 and now abandoned.

FIELD OF THE INVENTION

This invention relates to highly crystalline, rapidly crystallizing thermoplastic composition comprising a high molecular weight polyalkylene terephthalate and an aliphatic acid ester which causes the polyester to crystallize rapidly.

BACKGROUND OF THE INVENTION

Polyalkylene terephthalates are used for manufacturing fibers, films and molded articles. They have excellent physical properties such as high wear resistance, durability, and high dimensional accuracy due to their partly crystalline structure and they are, therefore, particularly suitable for the manufacture of heavy duty molded articles. The mechanical properties can be further improved by incorporating reinforcing materials such as glass fibers (British Pat. No. 1,111,012, U.S. Pat. No. 3,368,995 and German Auslegeschrift No. 2,042,447).

Polyethylene terephthalate (PET) is particularly suitable for the manufacture of fibers, filaments, and sheets, but it is hardly suitable for injection molding because of high molding temperatures (approximately 140° C.) and relatively long molding times required. These stringent processing conditions prevent the use of polyethylene terephthalate for injection molding in spite of its high rigidity and heat distortion temperature. In particular, the high mold temperature required is beyond the equipment capabilities of many mold shops which have only water heated molds. Such molds are normally capable of temperatures no higher than about 110° C. Thus, wider use of this polymer is restricted not only by the economics of its long processing cycle but also by the inability of many potential end users to process the resin at all. Although polypropylene terephthalate (PPT) and polybutylene terephthalate (PBT) require shorter molding times and lower molding temperatures (approximately 80° C.) owing to their higher rate of crystallization, they are inferior to polyethylene terephthalate in their physical properties, particularly in their heat distortion temperature.

High crystallinity ensures hardness, dimensional stability and resistance to distortion even at elevated temperatures. For optimum properties high crystallinity must be arrived at as rapidly as possible. This in polyethylene terephthalate crystallization can be improved and accelerated by nucleation with finely divided inorganic solids (Netherlands Patent Application No. 65.11744). Generally the maximum degree of crystallinity obtainable for PET gives an energy of crystallization of about 14 cal/g and satisfactory mechanical properties are usually obtained when the crystallization energy is in excess of about 6 cal/g. The injection molding cycle time which governs the economics of the process depends on the time interval for which the cast must stay in the mold. To obtain a satisfactory degree of crystallization these cycles must be uneconomically long even at high molding temperatures and, therefore, prevent widely using polyethylene terephthalate in the manufacture of injection molded articles.

An object of the present invention is the provision of polyalkylene terephthalates compositions which have a higher crystallization velocity and higher crystallinity than those already known. A further object of the invention are polyalkylene terephthalates compositions which can be molded more rapidly and at lower temperatures than has been possible heretofor. An especial object is the provision of polyethylene terephthalates compositions (PET) which can be molded at temperatures below about 120° C. and still retain a high degree of crystallinity.

In such polyester compositions the degree of crystallinity required for high dimensional stability is achieved more rapidly so that the injection molding cycles are substantially shortened. Also, the molding temperature can be lower without impairing the crystallization behavior. The injection molded casts, therefore, cool more rapidly, and the residence time in the mold is, therefore, also reduced.

SUMMARY OF THE INVENTION

The present invention provides rapidly crystallizing thermoplastic compositions comprising
1. a high molecular weight polyalkylene terephthalate having an intrinsic viscosity of at least about 0.4 dl/g, preferably at least about 0.8 dl/g (determined on an 0.5% by weight solution in a mixture of phenol and tetrachloroethane in proportions by weight of 1:1 at 25° C.), and
2 no less than about 0.5 preferably 4.0 weight % and no more than about 30, preferably 15, most preferably 12 weight % based on the weight of 1 and 2 of an aliphatic acid ester formed from an aliphatic, cycloaliphatic or araliphatic carboxylic acid with between 1 and 25 preferably 1 and 8 carbon atoms and alcohols selected from aliphatic, cycloaliphatic and aralphatic alcohols with between 1 and 20 preferably 11 and 20 carbon atoms, said ester being monomeric and free of groups substantially reactive with said high molecular weight polyalkylene terephthalate under injection molding conditions.

The present invention also provides a process for the production of rapidly crystallizing thermoplastic compounds, wherein a high molecular weight polyalkylene terephthalate having an intrinsic viscosity of at least 0.4 dl/g, preferably at least about 0.8 dl/g (determined on an 0.5% by weight solution in a mixture of phenol and tetrachloroethane in proportions by weight of 1:1 at 25° C.) and no less than about 0.5, preferably 4% by weight and no more than about 30, preferably 15 and most preferably 12% by weight of an aliphatic acid ester are mixed together and homogenized in the melt. The operation can be carried out in a mixing screw extruder, for example; the solidified melt can, subsequently, be granulated.

The present invention also provides a method of injection molding polyethylene terephthalate at mold temperatures of about 120° C. or less to produce articles, preferably articles in which the molded composition has an energy of crystallization of about 6 cal/g or greater by incorporating no less than about 0.5, preferably 4 weight % and no more than about 30, preferably 15, and most preferably 12 weight % of an aliphatic acid ester into said polymer.

DETAILED DESCRIPTION OF THE INVENTION

The dicarboxylic acid component of the polyalkylene terephthalate (1) consists of terephthalic acid which may contain up to 10 mol %, based on the acid component of other aromatic dicarboxylic acids having from 6 to 14 C-atoms of aliphatic dicarboxylic acids having from 4 to 8 C-atoms or of cycloaliphatic dicarboxylic acids having from 8 to 12 C-atoms. Examples of such dicarboxylic acids to be included with terephthalic acid are phthalic acid, isophthalic acid, naphthalene-2,6-dicarboxylic acid, diphenyl-4,4'-dicarboxylic acid, adipic acid, sebacic acid, and cyclohexanediacetic acid.

The preferred diol component of the polyalkylene terephthalate is a diol from 1 to 12 carbon atoms for example, propane-1,3-diol, butane-1,4-diol, pentane-1,5-diol, hexane-1,6-diol or cyclohexane-1,4-dimethanol and, preferably, ethylene glycol; it may contain up to 10 mol % of other aliphatic diols having from 3 to 8 C-atoms, cycloaliphatic diols having from 6 to 15 C-atoms or aromatic diols having from 6 to 21 C-atoms. Examples of such additional diols ("Codiols") include 3-methylpentanediol-(2,4), 2-methylpentanediol-(1,4), 2,2,4-trimethylpentanediol-(1,3), 2-ethylhexanediol-(1,3), 2,2-diethylpropanediol-(1,3), hexanediol-(1,3), 1,4-di-($\beta$-hydroxyethoxy)-benzene, 2,2-bis-(4-hydroxycyclohexyl)-propane, 2,4-dihydroxy-1,1,3,3-tetramethyl-cyclobutane, 2,2-bis-(3-$\beta$-hydroxyethoxyphenyl)-propane and 2,2-bis(4-hydroxypropoxyphenyl)-propane.

The polyalkylene terephthalates (1) can be branched by incorporating trihydric or tetrahydric alcohols or tribasic or tetrabasic acids, as described in German Offenlegungsschrift No. 1,900,270 and in U.S. Pat. No. 3,692,744. Examples of suitable branching agents include trimesic acid, pyromellitic acid, trimethylol-propane and ethane, and pentaerythritol. It is advisable not to use more than 1 mol % of branching agent, based on the quantity of acid component.

Polyalkylene terephthalates derived mainly from terephthalic acid and ethylene glycol are preferred and homoethylene terephthalate, i.e, a product produced substantially only from ethylene glycol and terephthalate acid or its ester, or its anhydride is most preferred.

The polyalkylene terephthalate can be prepared in known manner by a. esterification or transesterification of terephthalic acid and/or of the corresponding dialkylterephthalates, preferably the dimethyl ester, with from 1.05 to 5.0 mol, preferably from 1.4 to 3.6 mol of the diol, based on 1 mol of the dicarboxylic acid component, and optionally the branching agent, in the presence of esterification and/or transesterification catalysts (first stage), and b. polycondensation of the resulting reaction products in the presence of polycondensation catalysts at temperatures between 200° and 320° C. at reduced pressure (preferably below 1 Torr) (second stage).

Both the first step (a) and the second step (b) of condensation are usually carried out in the presence of catalysts, e.g., those described by R.E. Wilfong in J. Polym. Sci. 54, 385 (1961). Some of these catalysts (A) are more powerful accelerators of the esterification reaction, (a) others (B) for the polycondensation reaction (b), still others (C) are fairly active for both (a) and (b).

The following are examples: catalysts (A) which are suitable for accelerating reaction (a):
1. Lithium, sodium, potassium, calcium, strontium and boron in the form of the metals or their oxides, hydrides, formates, acetates, alcoholates or glycollates;
2. calcium and strontium chlorides and bromides;
3. tertiary amines;
4. calcium and strontium malonates, adipates, benzoates, etc.;
5. lithium salts of dithiocarbamic acids.

The following are examples of catalysts (B) suitable for the polycondensation reaction (b):
1. Molybdenum, germanium, lead, tin, and antimony in the form of the metals or their oxides, hydrides, formates, alcoholates or glycollates;
2. zinc and lead perborates and borates;
3. zinc, manganese (II), cobalt, magnesium, chromium, iron and cadmium succinates, butyrates, adipates or enolates of a diketone;
4. zinc chloride and bromide;
5. lanthanum dioxide and titanate;
6. neodymium chloride;
7. mixed salts of antimony, e.g. potassium antimony tartrate, and salts of antimonic acids, such as potassium pyroantimonate;
8. zinc or manganese salts of dithiocarbamic acids;
9. cobalt naphthanate;
10. titanium tetrafluoride or tetrachloride;
11. alkyl ortho-titanates;
12. titanium tetrachloride ether complexes;
13. quaternary ammonium salts carrying a titanium hexaalkoxy group; titanium tetraalkoxides, alkali metal or alkaline earth metal compounds of aluminum, zirconium or titanium alkoxides;
14. organic quaternary ammonium, sulphonium, phosphonium and oxonium hydroxides and salts;
15. barium malonate, adipate, benzoate, etc.;
16. lead, zinc, cadmium or manganese salts of the monoalkyl ester of a phenylene dicarboxylic acid;
17. antimony catechuic complexes with an amino alcohol or with an amine and an alcohol;
18. uranium trioxide, tetrahalide, nitrate, sulphate or acetate.

The following are examples of catalysts (C) which are suitable for accelerating both steps (a) & (b) of the reaction;
1. Barium, magnesium, zinc, cadmium, aluminum, manganese and cobalt as the metals or their oxides, hydrides, formates, alcoholates, glycolates or, preferably as acetates;
2. aluminum chloride and bromide;
3. zinc, manganese (II), cobalt, magnesium, chromium, iron and cadmium succinates, butyrates, adipates or enolates of a diketone.

The most suitable compounds for use as catalysts (A) are calcium, zinc and manganese salts, particularly the acetates.

The most suitable catalysts (B) are the compounds of zinc, manganese, cobalt, antimony, germanium, titanium and tin, e.g., zinc and manganese acetate, antimony trioxide, trichloride and triacetate, and germanium dioxide and tetrachloride.

The most suitable catalysts (C) are particularly the titanium compounds, e.g., tetraalkyltitanium acid esters having alkyl groups with from 1 to 10 C-atoms, such as tetraisopropyltitanate and tetrabutyltitanate.

The catalysts are used in quantities of from 0.001 to 0.2% by weight, based on the dicarboxylic acid components.

Inhibitors may be added in the process to inhibit the catalysts (A) after completion of the first reaction step(a) and to increase the stability of the end product, (cf. "Polyesterfasern" by H. Ludewig, 2nd Edition, publishers Akademie-Verlag, Berlin 1974). The following are examples of such inhibitors: phosphoric acid, phosphorous acid and aliphatic, aromatic and araliphatic esters thereof, e.g., the alkyl esters having from 6 to 18 C-atoms in the alcohol component, phenyl esters in which the phenyl groups can carry 1 to 3 substituents having 6 to 18 C-atoms, such as trinonylphenyl phosphate, dodocyl phenyl phosphate or triphenyl phosphate. These inhibitors are usually added in quantities of from 0.01 to 0.6% by weight based on the dicarboxylic acid component.

In order to obtain an even higher molecular weight, the polyalkylene terephthalates may be subjected to a solid phase polycondensation. This is generally carried out by subjecting the granulated product to a temperature which is from 60° to 6° C. below the melting point of the polymer, either in a stream of nitrogen or under a vacuum of less than 1 Torr.

The esterification product 2 is a essentially monomeric compound containing the characteristic ester linkage

wherein both the carbonyl carbon atom and the chain oxygen are linked aliphatically or cycloaliphatically bound carbon atoms. As discussed in more detail hereinafter these compounds may also contain aromatic or other substituents. For convenience, any carboxylic acid which has its carbonyl carbon atoms attached to a carbon atom which is bound to three other moieties, be they hydrogen or otherwise, is hereinafter referred to as an aliphatic carboxylic acid.

The compounds to be employed as esterification product 2 may essentially correspond to the formula

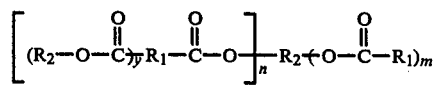

wherein
$R_1$ may be the same or different and denotes the carboxyl group free residue of a linear or branched aliphatic, cycloaliphatic or araliphatic carboxylic acid of between 1 and 25 carbon atoms, preferably between 1 and 8,
$R_2$ may be the same or different and denotes the hydroxyl group free residue of a linear or branched aliphatic, cycloaliphatic or araliphatic alcohol of between 1 and 20 carbon atoms, preferably between 11 and 20,
m is an integer of between 0 and 4 inclusive,
n is 1 when m is 0 otherwise it is 0, and
y is an integer of between 1 and 3 inclusive.
$R_1$ and $R_2$ may carry any substituents which are substantially unreactive with high molecular weight polyalkylene terephthalate under injection molding conditions.

The esterification products 2 can be prepared by esterification or transesterification of the aliphatic, cycloaliphatic or aralphatic acids and/or the corresponding dialkyl derivatives with the appropriate alcohols. These products should be synthesized in such a way as to be themselves substantially unreactive with the high molecular weight polyalkylene terephthalates under injection molding conditions.

A detailed description of the various methods of preparation is given by H. Henecka et al in Houben-Weyl, Volume VIII, pages 359–680 (1952); by E. Müller in Houben-Weyl 14/2 (1963),1 et seq; by Georg Thieme Verlag, Stuttgart 1963; and by V.V. Korshak and S. V. Vinogradova, "Polyesters", Pergamon Press, Oxford 1965, especially pages 34–63.

Preferred esterification products are those which are derived from the following acids and alcohols which include some mono- and tricarboxylic acids as well as some more than difunctional alcohols of the following list:

1. Di- and Tricarboxylic Acids
   adipic acid
   azelaic acid
   citric acid $C(OH)(COOH)(CH_2COOH)_2$
   fumaric, maleic acid $HOOCHC=CHCOOH$
   glutaric acid
   succinic acid
   tartaric acid $HOOC(CHOH)_2COOH$
   sebacic acid
2. Monocarboxylic Acids
   acetic acid
   iso-butyric acid
   caproic acid
   caprylic acid
   pelargonic acid
   2-ethylhexanoic acid
   lauric acid
   myristic acid
   palmitic acid
   stearic acid
   oleic acid $CH_3(CH_2)_7 CH=CH(CH_2)_7COOH$
   ricinolic acid $CH_3(CH_2)_5 CH(OH)CH_2CH=CH(CH)_7COOH$
   2-ethylbutyric acid
   behenic acid
   abictic acid
   2-phenylbutyric acid
   tall oil
   fatty acid
3. Di and Higher Functional Alcohols
   ethyleneglycol
   propanediol 1,3/1,2
   butanediol 1,3/1,4
   pentanediol 1,5
   hexanediol 1,6
   dipropyleneglycol 1,3/1,2
   diethyleneglycol
   triethyleneglycol
   tetraethyleneglycol
   polyethylene glycol $\overline{M}_n=400$
   neopentylglycol $HO-CH_2-C(CH_3)_2-CH_2OH$
   glycerol $HOCH_2-CHOH-CH_2OH$
   trimethylolethane $CH_3C(CH_2OH)_3$
   trimethylolpropane $C_2H_5C(CH_2OH)_3$
   pentaerythritol $C(CH_2OH)_4$
   2,2,4 trimethyl-1,3-pentanediol
   sucrose
4. Monofunctional Alcohols 2-ethylhexanol, isononol, tertiary butanol, methanol,
methanol, isopropanol
octylbenzylalcohol

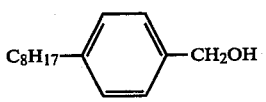

butylalcohol, iso-butylalcohol
2-ethylhexanol
iso-nonylalcohol
n-octylalcohol, iso-octylalcohol
n-decylalcohol, iso-decylalcohol
butoxyethylalcohol CH$_3$(CH$_2$)$_3$-O(CH$_2$)$_2$OH
butoxyethyloxyethylalcohol  CH$_3$(CH$_2$)$_3$-O(CH$_2$)$_2$O(CH$_2$)$_2$OH
cyclohexylalcohol
n-hexylalcohol

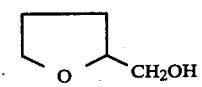

tetrahydrofurfurylalcohol
2-butoxyethylalcohol  CH$_3$-CH-(OCH$_2$CH$_2$OH)-CH$_2$CH$_3$
ethylalcohol
amylalcohol
n-undecylalcohol
tridecylalcohol
butylbenzylalcohol
methylcyclohexylalcohol
methoxyethylalcohol
benzylalcohol
allylalcohol CH$_2$=CH—CH$_2$OH
hydroabietylalcohol Especially preferred esterification products 2 are those which are derived from adipic acid or sebacic acid as the dicarboxylic acid, and 2-ethylhexanol, isononanol, n-butanol, benzyl alcohol or octanol as the monohydric alcohol component.

Examples of suitable aliphatic carboxylic acid esters are: adipic acid di-(2-ethylhexyl) ester, adipic acid di-isononyl ester, adipic acid di-n-butyl ester, sebacic acid dibutyl ester, sebacic acid diocytl ester, sebacic acid di-benzyl ester, sebacic acid 2-ethylhexyl ester, azelaic acid dioctyl ester, azelaic acid dihexyl ester and azelaic acid diamyl ester. However, as is evident from the preferred acids and alcohols suitable esters may be synthesized from components which contain after incorporation into the esters:

a. double bonds, e.g., fumaric acid, maleic acid, oleic acid, ricinoleic acid, allylalcohol;

b. phenyl groups, e.g., 2-phenylbutyric acid, octylbenzylalcohol, butylbenzyl alcohol, phenol, benzylalcohol cumylphenol;

c. ether bonds, e.g., diethyleneglycol, dipropyleneglycol, polyethyleneglycol, tetrahydrofurfurylalcohol, butoxyethylalcohol, etc.;

d. thioetherbonds, e.g., 2-hydroxyethyl sulfide, thiodiacetic acid, thiodipropanol, thiodipropionic acid;

e. cyclohexyl groups, e.g., cyclohexanol, cyclohexanediol, cyclohexanedimethylol, cyclohexanoic acid; and f. halogen atoms, e.g., chloromaleic acid, tetrachlorophthalic acid, tetrachloro terephthalic acid, (α-bromoisobutyric acid, 2-bromopalmitic acid, 3-bromo-2-propanol, 3-chloropropionic acid, 3-chlorobenzylalcohol.

The esterification products 2 of the present invention are monomeric in the sense that they do not contain repeating structural units connected by the ester linkage

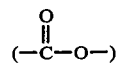

characteristic of polyester oligomers and polymers. They may, however, contain a small number of other repeating linkages such as the ether bond in triethylene glycol. But it is important that these esters are sufficiently compatible with the polyalkylene terephthalate to remain substantially uniformly distributed in the polymer during injection molding. It is believed that it is the ester bonds of these compounds which imparts them with compatibility for the high molecular weight polyester and that therefore these compounds should not have too high a proportion of other constituents. Therefore these esters should not have molecular weights in excess of about 900 and preferably not in excess of about 500.

The permitted ester substituents are "substantially unreactive" with the high molecular weight polyalkylene terephthalate under injection molding conditions in the sense that under such conditions any chemical interaction which may occur does not have a significant effect upon the macroscopic properties of the high molecular weight polyester. For instance, substituents which would cause cleavage of the linkage,

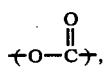

of the high polymer to the extent that its mechanical properties were significantly reduced would be excluded. Also excluded would be substituents which would cause significant crosslinking of the high polymer, such as epoxy groups if more than one were present per molecule of the ester.

Injection molding conditions for polyalkylene terephthalates are well known to those skilled in the art and are taught in U.S. Pat. No. 3,516,957, incorporated herein by reference, and Injection Molding Theory and Practice, by Ervin I. Rubin, published by Wiley Interscience, 1972. Generally, these conditions involve temperatures of between about 250° and 310° C., residence times at elevated temperatures of between about 1 and 15 minutes, pressures of up to about 20,000 psi and shear rates of between about 100 and 10,000 reciprocal seconds. These conditions may also include vacuum of down to 20 inches of Hg. Of course, these conditions also include mold temperatures of between about 100° and 200° C. but at these lower temperatures interaction between the high molecular weight polyalkylene terephthalate and substituents of the aliphatic acid ester are less probable than at the higher injection temperatures. Naturally suitable substituents need not be "substantially unreactive" at the extremes of these conditions but only over a reasonable portion thereof.

The compositions of the present invention find primary utility in injection molding and therefore exclude any esters which under such conditions would interact with the high molecular weight polyester to the extent of significantly degrading the polymers mechanical properties. Of course, the tendency of a given ester to cause such results would depend not only upon its inherent chemical activity but also upon its concentration in the composition. Its concentration in the composition would in turn depend upon its effectiveness in promoting more rapid crystallization of the polyester. Therefore a given ester might be suitable in the compositions of the present invention because at the concentration required for effective acceleration of the crystallization of the high molecular weight polymer it has no significant detrimental effect on the polymer's mechanical properties although at higher concentrations it would have detrimental effects.

Without limiting the generality of the foregoing or being bound by any particular theory of operation, it is believed that the aliphatic acid esters of the present invention function to improve, i.e., facilitate, the crystallization of the polyalkylene terephthalate to which they are added by improving the molecular mobility of the polymer chains. In order to do so most effectively, they should meet the following criteria:
1. they should be sufficiently compatible with the polymer matrix to remain substantially uniformly distributed during customary thermoplastic processing, such as extrusion and injection molding; and
2. they should significantly improve the speed and ease with which the polymer molecules can form themselves into a crystalline array.

Those esters which meet both of these criteria are preferred.

These criteria may be simultaneously met by selecting those esters which have a sufficient ester bond content to be compatible with the polyester matrix and yet a high enough carbon atom content to effect significant enhancement of molecular mobility. Among these esters are believed to be those which have carbon atom to ester bond ratios of no less than about 4, preferably 5, and most preferably 10 and of no greater than 15, preferably 14 inclusive of the carbonyl carbon atom. Therefore, the aliphatic acid esters having any of these ratios are preferred.

The compositions of the present invention which include polyalkylene terephthalates based primarily upon ethylene glycol and terephthalic acid may be molded at temperatures of below about 120° C. and still develop sufficient crystallinity to display the superior mechanical and chemical properties which make these resins attractive for injection molded articles. Such polymers typically display maximum heats of crystallization of no more than about 14 cal/g under optimum conditions (high mold temperatures, e.g., above about 140° C., and long residence time in the mold, e.g., in excess of one minute). When used in compositions of the present invention these polymers may be molded under much less favorable conditions (colder molds, e.g., below about 120° C. and shorter residence time in the mold, e.g., less than about 60 seconds) and still display heats of crystallization in excess of about 70% of those obtainable under optimum conditions, e.g., in excess of about 6 cal/g; thus, the present invention includes a process for molding resins based primarily, and preferably solely, upon terephthalic acid and ethylene glycol at mold temperatures of less than about 120° C. while retaining significant crystallinity, preferably more than about 70% of the maximum crystallinity obtainable under optimum injection molding conditions.

The process comprises intimately blending the terephthalic acid/ethylene glycol based resin and the esterification product 2 and injection molding the composition so prepared into molds held at temperatures less than about 120° C., preferably less than about 110° C. The polyester preferably consists of acid residues of which at least 90 mol % are derived from terephthalic acid and of alcohol residues of which at least 90 mol % are derived from ethylene glycol and most preferably is a homopolyethylene terephthalate. The other components of the polyester may be any of those discussed hereinabove as being suitable. The polyester should have a minimum intrinsic viscosity of about 0.4 dl/g, preferably 0.8 dl/g (measured as a 0.5% strength by weight solution in a phenol/tetrachloroethane mixture in a weight ratio of 1:1 at 25° C.). The ester may be any of those discussed hereinabove as being suitable for enhancing the crystallization of polyalkylene terephthalates. Sufficient ester should be used to permit the retention of a significant degree of crystallization by the polyester when injection molded into molds colder than about 120° C. Preferably no less than about 0.5 wt. %, more preferably no less than about 4 wt. % of this ester and no more than about 30 wt. %, more preferably 15 wt. %, most preferably 12 wt. %, is used based on the weight of polyester and ester.

In a preferred embodiment of this process aspect of the present invention the residence time in the mold is significantly less than that required for the unmodified polyester in making the same part. For small fairly simple parts this may be less than about 30 seconds, more preferably less than about 20 seconds and most preferably less than 10 seconds as compared to 40 seconds or more for unmodified resin. Adequate crystallinity can be assured under such conditions by using an amount of acid ester sufficient to impart at least 70% of the crystallinity achievable by the pure resin at mold temperatures above about 140° C. and residence times in excess of about 60 seconds. It is particularly desirable to use sufficient ester to impart heat of crystallization to the molded resin in excess of about 6 cal/g. Of course, significant reductions in the mold residence time of resins modified with conventional additives such as micro talc nucleating agent and glass fiber reinforcing agent are also obtained by further modifying these resins with appropriate amounts of aliphatic acid esters of the present invention.

The preparation of the polyester compositions according to the invention, which crystallize rapidly, from a polyalkylene terephthalate 1 and the esterification product 2 can be carried out in commercially available mixing equipment. Examples of suitable equipment are kneaders, single screw extruders and twin screw extruders. For further processing, the resulting mixture can be granulated after the melt has solidified. In this case also, a solid phase postcondensation reaction can follow.

In order to provide protection against the thermooxidative degradation, the customary amounts, preferably about 0.001 to 0.5% by weight, relative to the unfilled and reinforced polyalkylene terephthalates, of stabilizers can be added to the thermoplastic compositions according to the invention. Examples of suitable stabilizers are phenols and phenol derivatives, preferably sterically hindered phenols which contain alkali substituents with 1–6 C-atoms in the two o-positions relative to the phenolic hydroxyl group, amines, preferably secondary arylamines and their derivatives, phosphates and phosphites, preferably their aryl derivatives, quinones, copper salts of organic acids and addition compounds of copper-(1) halides with phosphites, such as, for example, 4,4'-bis-(2,6-di-tert.-butylphenol), 1,3,5-trimethyl-2,4,6-tris-(3,5-di-tert.-butyl-4-hydroxy-benzyl)-benzene, 4,4'-butylidene-bis-(6-tert.-butyl-m-cresol), 3,5-di-tert.-butyl-4-hydroxy-benzyl-phosphonic acid diethyl ester, N,N'-bis-($\beta$-naphthyl)-p-phenylenediamine, N,N'-bis-(1-methylheptyl)-p-phenylenediamine, phenyl-$\beta$-naphthylamine,4,4'-bis-($\alpha,\alpha$-di-methylbenzyl)-diphenylamine, 1,3,4-tris-(3,5-di-tert.-butyl-4-hydroxy-hydrocinnamoyl)-hexahydro-s-triazine, hydroquinone, p-benzoquinone, toluhydroquinone, p-tert.-butyl-pyrocatechol, chloranil, naphthoquinone, copper naphthenate, copper octoate, Cu-(I)Cl/triphenyl phosphate, Cu(I)Cl/trimethyl phosphite, Cu (I)Cl/tris-chloroethyl phosphite, Cu(I)Cl/tripropyl phosphite and p-nitrosodimethylaniline. Also suitable as stabilizers against molecular weight degradation from hydrolysis are carbodiimides.

The polyester compositions according to the invention can be reinforced with reinforcing materials. Metals, silicates, carbon and glass, mainly in the form of fibers, fabrics or mats, have proved useful as reinforcing materials. Glass fibers are a preferred reinforcing material.

In addition, if desired, inorganic or organic pigments, dyestuffs, lubricants and mold release agents, such as zinc stearate, montan waxes, UV absorbers and the like, can be added in customary amounts.

In order to obtain flame-resistant products, about 2–20% by weight, relative to the molding composition, of flameproofing agents which are in themselves known, for example, halogen-containing compounds, elementary phosphorus or phosphorus compounds, phosphorus/nitrogen compounds, antimony trioxide or mixtures of these substances, preferably antimony trioxide, decabromobiphenyl ether and tetrabromobisphenol A polycarbonate, can be added.

The rate of crystallization of the polyester compositions according to the invention can be further increased by adding about 0.01–1% by weight, relative to the unfilled and unreinforced polyester of nucleating agents. Suitable nucleating agents are the compounds known to those skilled in the art, such as those described, for example, in Kunststoff-Handbuch (Plastics Handbook), Volume VIII, "Polyester" ("Polyesters"), Carl Hanser Verlag, Munich, 1973, page 701.

The polyester compositions according to the invention are excellent starting materials for the production of films and fibers and preferably for the production of moldings of all types by injection molding.

EXAMPLES

In order to determine the processing cycle time which can be achieved, the injection mold for a gearwheel (∅ 40 mm, thickness 7 mm) was used in which the injection molding was pressed out of the mold by four ejector pins. The injection cycle with which the ejector pins just no longer penetrated into the finished injection molding and the injection molding fell out of the mold without difficulty was determined.

Table 1 gives the cooling times of the mold (i.e. the time interval between end of injection and removal of the extruder from the mold and the opening in the mold) and the total injection cycle times for several polyester resin compositions according to the invention based on nucleated PET with an intrinsic viscosity of 0.94 in 1:1 phenol-tetrachloroethane at 25° C. and aliphatic carboxylic acid esters (Examples 1–4) compared with non-modified PET.

Table 2 gives similar data for several polyester resin compositions filled with 30 weight % of glass fibers based on the weight of the composition, using the same PET.

In both tables, the weight of aliphatic ester is based on the weight of resin and monomeric ester.

In order to determine the amount and temperature of crystallization obtained under injection molding conditions scrapings from the end of $\frac{1}{8}"\times\frac{1}{2}"\times5"$ bars were subjected to differential scanning calorimetry. The sample bars were molded with at melt temperature of 260° C., mold temperatures of 100° and 140° C. and a cycle time of 20 seconds. The scrapings were heated at 20° C./minute to 280° C. to detect any post crystallization ($\alpha H_{cl}$) and to determine the enthalpy upon melting ($\alpha H_m$) and the melting point ($T_m$). The samples were then cooled at the same rate (20° C./minute) to determine the temperature ($T_c$) and enthalpy ($\Delta H_{c2}$) of crystallization.

The temperature of crystallization ($T_c$) was standardized to a base viscosity of 0.55 dl/g by means of the relationship published in Die Angewandte Makromolekulare Chemie 65 (1977) pgs. 1–21. The intrinsic viscosity of each molding was determined in ortho chlorophenol at 25° C.

The results for a number of compositions are reported in Table 3. The compositions contained 30 weight % of glass fibers based on the total composition and the indicated weight of additive based on the weight of resin plus additive. The base resin was polyethylene terephthalate.

These results show that as the carbon atom to ester bond ratio (C/E) is decreased the amount of crystallization obtained on molding as measured by $\Delta H_m - \Delta H_{cl}$ is increased at both molding temperatures. The velocity of crystallization is also improved as reflected by the reduction in $T_m - T_c$, particularly when adjusted for the differing intrinsic viscosities of the test specimens. The smaller this difference, the more rapidly the resin will crystallize on cooling and therefore the smaller the amount of crystallization left to occur on heating a molded sample (as reflected in $\Delta H_{cl}$).

TABLE 1

Polyethylene Terephthalate, i.v. 0.94 in 1:1 Phenol/Tetrachloroethane at 25° C.

| Example | Type of Carboxylic Acid | Amount (% by Weight) | Cylinder Temperature (°C.) | Mold Temperature (°C.) | Cooling Time | Total Injection Molding Cycle (Seconds) |
|---|---|---|---|---|---|---|
| | | 3 | 260 | 140 | 0 | 9.5 |
| | | 3 | 260 | 110 | 9 | 18.5 |
| 1 | Adipic acid di-(2-ethylhexyl)-ester | 5 | 260 | 108 | 3 | 12.5 |
| | | 5 | 260 | 140 | 0 | 9.5 |
| | | 10 | 260 | 110 | 0 | 9.5 |
| | | 10 | 260 | 90 | 0 | 9.5 |
| 2 | Adipic acid di-n-butyl ester | 5 | 260 | 107 | 8 | 17.5 |
| | | 3 | 260 | 110 | 12 | 21.5 |
| | | 10 | 260 | 110 | 0 | 9.5 |
| | | 10 | 260 | 90 | 0 | 9.5 |
| 3 | Adipic acid diisononyl ester | 5 | 260 | 112 | 6 | 15.5 |
| 4 | Adipic acid benzyl octyl ester | 5 | 260 | 110 | 14 | 23.5 |
| 5 | — | — | 270 | 140 | 30 | 39.5 |

TABLE 2

Polyethylene Terephthalate, i.v. 0.94 in 1:1 Phenol/Tetrachloroethane at 25° C. Filled with 30 Wt. % of Glass Fibers

| Example | Identity | Amount (% by Weight) | Cylinder Temperature (°C.) | Mold Temperature (°C.) | Cooling Time (Seconds) | Total Injection Molding Cycle (Seconds) |
|---|---|---|---|---|---|---|
| 6 | Di-2 ethyl adipate | 10 | 260 | 110 | 0 | 9.5 |
| 7 | Dibutyl adipate | 10 | 260 | 110 | 0 | 9.5 |
| 8 | None | — | 260 | 110 | 10.0 | 19.5 |

TABLE 3

Polyethylene Terephthalate Filled with 30 Weight % of Glass Fibers

| Example | Additives | C/E | Amount (%) | Mold Temp. (°C.) | i.v. (dl/g) | $\Delta H_{c1}$ (cal/g) | $\Delta H_m$ (cal/g) | $\Delta H_{c2}$ (cal/g) | $T_m$ (°C.) | $T_c$ (°C.) | $T_m$-$T_c$ (°C.) | $T_c$ Adjusted to 0.55 dl/g Intrinsic viscosity (°C.) | $T_m$-$T_c$ Adjusted to 0.55 dl/g Intrinsic Viscosity (°C.) |
|---|---|---|---|---|---|---|---|---|---|---|---|---|---|
| 9 | 2-Ethylhexyl-adipate | 11 | 10 | 100 | 0.82 | 0 | 8.7 | 8.7 | 247.0 | 199 | 48.0 | 211 | 36.0 |
| | | | 3 | 100 | 0.75 | 0.6 | 9.7 | 9.7 | 248.5 | 198 | 50.5 | 209 | 39.5 |
| | | | 10 | 140 | 0.85 | 0 | 8.4 | 8.4 | 248.5 | 199 | 48.5 | 213 | 35.5 |
| | | | 3 | 140 | 0.73 | 0 | 9.4 | 9.4 | 248 | 199 | 49.0 | 209 | 39.0 |
| 10 | Pentaerthytritol Tetrastearate | 19 | 10 | 100 | 0.69 | 3.6 | 6.7 | 6.4 | 251.5 | 195.5 | 56.0 | 205 | 46.5 |
| | | | 3 | 100 | 0.78 | 3.7 | 6.5 | 6.3 | 252 | 192 | 60.0 | 204 | 48.0 |
| | | | 10 | 140 | 0.71 | 3.6 | 5.9 | 5.9 | 253 | 199 | 54.0 | 209 | 44.0 |
| | | | 3 | 140 | 0.82 | 3.8 | 6.4 | 6.2 | 253 | 192 | 61.0 | 204 | 49.0 |
| 11 | Butyl-laurate | 16 | 10 | 100 | 0.84 | 3.2 | 6.7 | 6.3 | 251.0 | 193.5 | 57.5 | 207 | 44.0 |
| | | | 3 | 100 | 0.92 | 3.8 | 8.1 | 8.0 | 248.5 | 186.0 | 62.5 | 210 | 47.5 |
| | | | 10 | 140 | 0.86 | 2.9 | 6.4 | 6.0 | 252.5 | 195.5 | 57.0 | 209 | 43.5 |
| | | | 3 | 140 | 0.84 | 3.6 | 6.6 | 6.2 | 250.5 | 189.5 | 61.0 | 204 | 46.5 |
| 12 | Dioctyl-sebacate | 13 | 10 | 100 | 0.81 | 2.5 | 7.1 | 6.7 | 250.5 | 199 | 51.5 | 211 | 39.5 |
| | | | 3 | 100 | 0.65 | 3.5 | 6.8 | 6.3 | 251 | 200 | 51.0 | 208 | 43.0 |
| | | | 10 | 140 | 0.90 | 0.8 | 9.5 | 9.3 | 250.5 | 198 | 52.5 | 212 | 38.5 |
| | | | 3 | 140 | 0.83 | 2.0 | 6.5 | 5.9 | 249 | 194 | 55.0 | 207 | 42.0 |

Although the invention has been described in detail in the foregoing for the purpose of illustration, it is to be understood that such detail is solely for that purpose, and that variations can be made therein by those skilled in the art without departing from the spirit and scope of the invention except as it may be limited by the claims.

What is claimed is:

1. A thermoplastic composition which crystallizes rapidly, comprising
   a. a high molecular weight polyalkylene terephthalate which has an intrinsic viscosity of at least about 0.4 dl/g (measured as a 0.5% strength by weight solution in a phenol/tetrachloroethane mixture in a weight ratio of 1:1 at 25° C.) and b. about 0.5 to 30% by weight based on the weight of a. and b. of an esterification product of aliphatic carboxylic acids with 1 to 25 carbon atoms and alcohols selected from aliphatic, cycloaliphatic and araliphatic alcohols with 1 to 20 carbon atoms, said esterification product being monomeric and free of groups substantially reactive with said high molecular weight polyalkylene terephthalate under injection molding conditions and having a carbon atom to ester bond ratio of between 4 and 14 inclusive of the carbonyl carbon atom.

2. The composition of claim 1, containing about 4 to 30% by weight of the esterification product.

3. The composition of claim 1 in which the polyalkylene terephthalate has an intrinsic viscosity of at least about 0.8 dl/g.

4. The composition of claim 1 wherein the esterification product is based on sebacic acid, adipic acid or both.

5. A process for the production of a composition as claimed in claim 1, in which about 70 to 99.5% by weight of a high-molecular weight polyalkylene terephthalate with an intrinsic viscosity of at least about 0.4 dl/g and about 0.5 to 30% by weight of the esterification product of aliphatic carboxylic acids with 1 to 25 carbon atoms and alcohols selected from aliphatic, cycloaliphatic and araliphatic alcohols with 1 to 20 carbon atoms, said esterification product having a carbon atom to ester bond ratio of between 4 and 14 inclusive of the carbonyl carbon atom and being monomeric and free of groups substantially reactive with said high molecular weight polyalkylene terephthalate under injection molding conditions, are mixed together and homogenized in the melt.

6. A process according to claim 5, in which about 70 to 96% by weight of the polyalkylene terephthalate and about 4 to 30% by weight of the esterification product are mixed together and homogenized in the melt.

7. A process according to claim 5 in which the esterification product of aliphatic carboxylic acids has been produced by esterifying adipic acid or sebacic acid with a monohydric alcohol selected from 2-ethylhexanol, n-butanol, isonanol, benzyl alcohol, and octanol.

8. The product of the process of claim 7.

9. A process for increasing the rate of crystallization of a polyethylene terephthalate comprising incorporating therein sufficient esterification product of aliphatic carboxylic acids with 1 to 25 carbon atoms and alcohols selected from aliphatic, cycloaliphatic and araliphatic alcohols with 1 to 20 carbon atoms to ensure that said polyester when injection molded into molds held at temperatures of less than about 120° C. will have at least about 70% of the crystallinity obtainable by injection molding the polyester alone into molds held at temperatures in excess of 140° C. with mold residence times in excess of sixty seconds.

10. The process of claim 9 wherein the sufficient esterification product is present to ensure that the polyester will have a heat of crystallization of at least about 6 cal/g as molded into a mold colder than about 120° C.

11. The process of claim 9 wherein the esterification product is derived from an acid having between 1 and 8 carbon atoms.

12. A highly crystalline thermoplastic composition which crystallizes rapidly comprising a blend of
a. a polyalkylene terephthalate based on an acid component of at least about 90 mol % terephthalic acid and a diol component of at least about 90 mol % ethylene glycol, said polymer having an intrinsic viscosity of at least about 0.8 dl/g as measured at 25° C. in a 1:1 phenol tetrachloroethane mixture, and
b. about 0.5 to 30 weight % based on the weight of a and b of an esterification product of sebacic or adipic acid with a monohydric alcohol selected from 2-ethylhexanol, n-butanol, isonanol, benzyl alcohol and octanol.

13. A highly crystalline thermoplastic composition which crystallizes rapidly, comprising
a. a high molecular weight polyalkylene terephthalate which has an intrinsic viscosity of at least about 0.4 dl/g (measured as a 0.5% strength by weight solution in a phenol/tetrachloroethane mixture in a weight ratio of 1:1 at 25° C) and
b. about 0.5 to 30% by weight based on the weight of a and b of an esterification product of aliphatic carboxylic acids with 1 to 8 carbon atoms and alcohols selected from aliphatic, cycloaliphatic and araliphatic alcohols with 1 to 20 carbon atoms, said esterification product being monomeric and free of groups substantially reactive with said high molecular weight polyalkylent terephthalate under injection molding conditions.

14. A highly crystalline thermoplastic composition which crystallizes rapidly, comprising
a. a high molecular weight polyalkylene terephthalate which has an intrinsic viscosity of at least about 0.4 dl/g (measured as a 0.5% strength by weight solution in a phenol-tetrachloroethane mixture in a weight ratio of 1:1 at 25° C.) and
b. about 4 to 30% by weight based on the weight of a and b of an esterification product of aliphatic carboxylic acids with 1 to 25 carbon atoms and alcohols selected from aliphatic, cycloaliphatic and araliphatic alcohols with 1 to 20 carbon atoms, said esterification product having no substituents substantially reactive with said high molecular weight polyalkylene terephthalate under injection molding conditions and being monomeric.

15. A process for injection molding a thermoplastic polyester comprising
1. intimately blending
a. a polyester at least about 90 mol % of whose acid residues are derived from terephthalic acid and at least 90 mol % of whose alcohol residues are derived from ethylene glycol, said polyester having an intrinsic viscosity of at least about 0.4 dl/g in 1:1 phenol/tetrachloroethane at 25° C., with
b. the monomeric esterification product of aliphatic carboxylic acids having between 1 and 25 carbon atoms with alcohols selected from aliphatic, cycloaliphatic and araliphatic alcohols with between 1 and 20 carbon atoms, said esterification product being free of groups substantially reactive with said polyester under injection molding conditions, and
2. injection molding said blend into molds held at temperatures no more than about 120° C., a sufficient amount of said esterification product being included in the blend to ensure a significant degree of crystallinity to the molded polyester.

16. The process of claim 15 wherein sufficient esterification product is used to ensure that the molded polyester has no less than about 70% of the crystallinity obtainable by injection molding the polyester alone into molds held at least about 140° C. with residence times of in excess of about 60 seconds.

17. The process of claim 16 wherein the polyester consists essentially of terephthalic acid residues and ethylene glycol residues.

18. The process of claim 15 wherein sufficient esterification product is used to ensure that the molded polyester has a heat of crystallization of no less than about 6 cal/g.

19. An improved process for forming injection molded articles comprising
  1. intimately blending
    a. a polyester at least about 90 mol % of whose acid residues are derived from terephthalic acid and at least 90 mol % of whose alcohol residues are derived from ethylene glycol, said polyester having an intrinsic viscosity of at least about 0.4 dl/g in 1:1 phenol/tetrachloroethane at 25° C., with
    b. the monomeric esterification product of an aliphatic carboxylic acid having between 1 and 25 carbon atoms with alcohols selected from aliphatic, cycloaliphatic and araliphatic alcohols with between 1 and 20 carbon atoms, said esterification product being free of groups substantially reactive with said polyester under injection molding conditions, and
  2. injection molding said blend with mold temperatures less than about 120° C. and with mold residence times significantly less than those required when molding the same part from the polyester alone, the amount of aliphatic acid ester and the residence time being sufficient to ensure at least about 70% of the crystallinity obtainable by molding the polyester alone with mold temperatures no less than about 140° C. and residence times in excess of 60 seconds.

20. A thermoplastic composition which crystallizes rapidly consisting essentially of
  a. a high molecular weight polyalkylene terephthalate which has an intrinsic viscosity of at least about 0.4 dl/g (measured as a 0.5% strength by weight solution in a phenol/tetrachloroethane mixture in a weight ratio of 1:1 at 25° C.),
  b. about 0.5 to 30% by weight based on the weight of a. and b. of an esterification product of aliphatic carboxylic acids with 1 to 25 carbon atoms and alcohols selected from aliphatic, cycloaliphatic and araliphatic alcohols with 1 to 20 carbon atoms, said esterification product being monomeric and free of groups substantially reactive with said high molecular weight polyalkylene terephthalate unde injection molding conditions and having a carbon atom to ester bond ratio of between 4 and 14 inclusive of the carbonyl carbon atom, and
  c. up to about 1 wt. % of nucleating agent.

21. A glass reinforced thermoplastic composition which crystallizes rapidly, consisting essentially of
  a. a high molecular weight polyethylene terephthalate which has an intrinsic viscosity of at least 0.4 dl/g (measured as a 0.5% strength by weight solution in a phenol/tetrachloroethane mixture in a weight ratio of 1:1 at 25° C.),
  b. about 0.5 to 30% by weight based on the weight of a. and b. of an esterification product of aliphatic carboxylic acids with 1 to 25 carbon atoms and alcohols selected from aliphatic, cycloaliphatic and araliphatic alcohols with 1 to 20 carbon atoms, said esterification product being monomeric and free of groups substantially reactive with said high molecular weight polyalkylene terephthalate under injection molding conditions and having a carbon atom to ester bond ratio of between 4 and 14 inclusive of the carbonyl carbon atom,
  c. a reinforcing amount of glass fibers, and
  d. up to about 1 wt. % of nucleating agent.

22. A thermoplastic composition which crystallizes rapidly consisting essentially of
  a. a high molecular weight polyalkylene terephthalate which has an intrinsic viscosity of at least about 0.4 dl/g (measured as a 0.5% strength by weight solution in a phenol/tetrachloroethane mixture in a weight ratio of 1:1 at 25° C.),
  b. about 0.5 to 30% by weight based on the weight of a. and b. of an esterification product of aliphatic carboxylic acids with 1 to 25 carbon atoms and alcohols selected from aliphatic, cycloaliphatic and araliphatic alcohols with 1 to 20 carbon atoms, said esterification product being monomeric and free of groups substantially reactive with said high molecular weight polyalkylene terephthalate under injection molding conditions and having a carbon atom to ester bond ratio of between 4 and 14 inclusive of the carbonyl carbon atom,
  c. up to about 1 wt. % of nucleating agent, and
  d. about 2 to 20% by weight, based on the weight of the molding composition, of flameproofing agent.

23. A glass reinforced thermoplastic composition which crystallizes rapidly, consisting essentially of
  a. a high molecular weight polyethylene terephthalate which has an intrinsic viscosity of at least 0.4 dl/g (measured as a 0.5% strength by weight solution in a phenol/tetrachloroethane mixture in a weight ratio of 1:1 at 25° C.),
  b. about 0.5 to 30% by weight based on the weight of a. and b. of an esterification product of aliphatic carboxylic acids with 1 to 25 carbon atoms and alcohols selected from aliphatic, cycloaliphatic and araliphatic alcohols with 1 to 20 carbon atoms, said esterification product being monomeric and free of groups substantially reactive with said high molecular weight polyalkylene terephthalate under injection molding conditions and having a carbon atom to ester bond ratio of between 4 and 14 inclusive of the carbonyl carbon atom,
  c. a reinforcing amount of glass fibers,
  d. up to about 1 wt. % of nucleating agent, and
  e. about 2 to 20% by weight relative to the molding composition, of flameproofing agent.

* * * * *